United States Patent
Prakash

(10) Patent No.: US 9,939,108 B2
(45) Date of Patent: Apr. 10, 2018

(54) WIRE WRAPPED PRESSURE VESSELS

(75) Inventor: Amit Prakash, Hudson, OH (US)

(73) Assignee: WireTough Cylinders, LLC, Bristol, VA (US)

( * ) Notice: Subject to any disclaimer, the term of this patent is extended or adjusted under 35 U.S.C. 154(b) by 2101 days.

(21) Appl. No.: 12/235,856

(22) Filed: Sep. 23, 2008

(65) Prior Publication Data

US 2009/0095796 A1   Apr. 16, 2009

Related U.S. Application Data

(60) Provisional application No. 60/980,268, filed on Oct. 16, 2007.

(51) Int. Cl.
*F17C 1/06* (2006.01)
*F17C 1/02* (2006.01)

(52) U.S. Cl.
CPC ........ *F17C 1/06* (2013.01); *F17C 2201/0109* (2013.01); *F17C 2201/035* (2013.01); *F17C 2201/054* (2013.01); *F17C 2201/056* (2013.01); *F17C 2201/058* (2013.01); *F17C 2203/012* (2013.01); *F17C 2203/0604* (2013.01); *F17C 2203/066* (2013.01); *F17C 2203/0619* (2013.01); *F17C 2203/0636* (2013.01); *F17C 2203/0639* (2013.01); *F17C 2203/0646* (2013.01); *F17C 2203/0656* (2013.01); *F17C 2203/0658* (2013.01); *F17C 2203/0663* (2013.01); *F17C 2209/2154* (2013.01); *F17C 2221/011* (2013.01); *F17C 2221/012* (2013.01); *F17C 2221/033* (2013.01); *F17C 2221/035* (2013.01); *F17C 2223/0123* (2013.01);

(Continued)

(58) Field of Classification Search
USPC .................................. 220/588–592; 228/184
See application file for complete search history.

(56) References Cited

U.S. PATENT DOCUMENTS

| 1,281,557 A | 10/1918 | Goodall |
| 2,829,671 A | 4/1958 | Ernst |

(Continued)

OTHER PUBLICATIONS

Raymond, Louis, Second National Symposium on Test Methods for Hydrogen Embrittlement: Prevention and Control; sponsored by ASTM Subcommittee F7.4 on Hydrogen Embrittlement and held in Los Angeles, May 24-26, 1985. ; P309.

(Continued)

*Primary Examiner* — Anthony Stashick
*Assistant Examiner* — Kaushikkumar Desai
(74) *Attorney, Agent, or Firm* — David L. King

(57) ABSTRACT

A pressure vessel (2) for the storage of fluid has a core (10) made of metal or polymer and is wrapped either completely or partially from outside with a high strength fibers (21, 22) for reinforcement wherein one of the reinforcing fibers is a metal wire (21) of a single filament or cables of multi filaments having strength from 2000 MPa to 6000 MPa. The wire has a plastic ductility of over 20% in reduction in area (RA) at tensile fracture. The metal wire (21) is made of steel or nickel or titanium or their respective alloys. The core (10) of the vessel (2) is first wrapped with a resin covered ceramic fibers such as carbon, fiberglass and subsequently wrapped with the metal wire (21) with or without other fibers (22). The metal wires (21) can be of different diameters in parallel or cabled forms.

3 Claims, 3 Drawing Sheets

(52) U.S. Cl.
CPC ..... *F17C 2223/0153* (2013.01); *F17C 2223/036* (2013.01); *F17C 2260/011* (2013.01); *F17C 2260/012* (2013.01); *F17C 2260/042* (2013.01); *F17C 2260/053* (2013.01); *F17C 2270/0168* (2013.01); *F17C 2270/0186* (2013.01); *Y02E 60/321* (2013.01)

(56) References Cited

U.S. PATENT DOCUMENTS

| | | | |
|---|---|---|---|
| 3,184,092 | A | 5/1965 | George |
| 3,604,587 | A | 9/1971 | Pechacek |
| 3,631,382 | A * | 12/1971 | Paine et al. ............ 439/736 |
| 3,739,405 | A | 6/1973 | Schmidt |
| 3,905,398 | A | 9/1975 | Johansen et al. |
| 5,337,972 | A | 8/1994 | Bhagwat et al. |
| 5,425,830 | A | 6/1995 | Bhagwat et al. |
| 5,632,307 | A * | 5/1997 | Fawley et al. ............ 138/99 |
| 5,779,829 | A | 7/1998 | Prakash et al. |
| 5,822,838 | A | 10/1998 | Seal et al. |
| 6,058,713 | A * | 5/2000 | Bowen et al. ............ 62/7 |
| 6,074,595 | A * | 6/2000 | Eisberg et al. ............ 264/496 |
| 6,109,306 | A | 8/2000 | Kleinert |
| 6,247,514 | B1 | 6/2001 | Kim et al. |
| 6,401,963 | B1 * | 6/2002 | Seal et al. ............ 220/586 |
| 6,843,237 | B2 * | 1/2005 | Bowen et al. ............ 123/527 |
| 6,960,318 | B2 | 11/2005 | Yoneda et al. |
| 7,082,978 | B2 | 8/2006 | Sinopoli et al. |
| 7,412,956 | B2 | 8/2008 | Gotou et al. |
| 7,641,949 | B2 * | 1/2010 | DeLay et al. ............ 428/35.5 |
| 2003/0037885 | A1 * | 2/2003 | Hauber ............ 156/425 |
| 2003/0085117 | A1 * | 5/2003 | Keller et al. ............ 204/196.07 |
| 2004/0040969 | A1 * | 3/2004 | DeLay et al. ............ 220/586 |
| 2004/0242096 | A1 * | 12/2004 | Prakash ............ 442/19 |
| 2005/0051251 | A1 * | 3/2005 | Sinopoli et al. ............ 152/556 |
| 2005/0260373 | A1 * | 11/2005 | DeLay et al. ............ 428/36.4 |

OTHER PUBLICATIONS

B. N. Popov, G. Zheng and Ralph E. White" Surface Treatment for Mitigation of Hydrogen Absorption and Penetration into AISI 4340 Steel", in The Proceedings of The International Technical Conference of AESF SUR/FIN, 1993, Anaheim, Jun. 21-24, p. 809-828.

G. Zheng, B. N. Popov and R. E. White "Surface Treatment for Mitigation of Hydrogen Penetration into AISI 4340 Steel and Inconel 718 Alloy," Journal of Applied Electrochemistry, 25, (1995), 212-218.

C. San Marchi, Technical Reference on Hydrogen Compatibility of Materials, Sandia National Laboratories, May 2006.

International Standard ISO 11439: Gas Cylinders.

* cited by examiner

WIRE WRAPPED PRESSURE VESSELS

RELATED APPLICATIONS

This patent application claims priority to provisional application No. 60/980,268 entitled "Pressure Vessels for Ground Vehicles" filed on Oct. 16, 2007.

TECHNICAL FIELD

This invention relates to high pressure containers or vessels for holding liquids or gasses.

BACKGROUND OF THE INVENTION

The scope of a pressure vessel applies to any container having pressure differential between its inside and outside. The contained energy is proportional to the pressure and volume of the fluid stored inside. The vessel requires proper structural reinforcement to balance the stored energy. While high strength materials provide the necessary strength at lower weight, an additional parameter, the energy of fracture of the total structure must be high enough to effectively control the failure. High toughness materials are therefore necessary for the construction of a pressure vessel to exceed the fracture mechanics based 'leak-before-fail' requirement. Metals usually provide a good combination of strength, modulus and fracture toughness. Reinforcement of high pressure hose and pressure vessels by metal wires has a history of over 100 years as an example a reference of wire appears in U.S. Pat. No. 1,281,557 of October 1918 by Goodall.

High strength fibers such as carbon or glass fibers are currently in use to reinforce a metal or polymer core pressure vessel as described in U.S. Pat. Nos. 7,412,956, 7,219,812 and 5,822,838. Composite Overwrapped Pressure Vessels (COPV) are made by wrapping carbon or glass fibers over a polymer or metal core tank. There are however two disadvantages with these ceramic fibers. First is the cost as a premium resin and special processing are required to maximize the mechanical properties of glass or carbon fiber reinforced composites. Secondly, the composite has almost no plastic ductility thus low fracture toughness which makes the structure highly sensitive to minor surface defects or damage.

Compared to above ceramic fibers, recent high strength metal wires provide excellent combination of strength and plastic ductility. Tire cord quality wires have been made in the strength range of 2000 to 4000 MPa. Unlike ceramic fibers, metal wires have good longitudinal and torsional plastic behaviors and thus can easily be processed to a cable and used more efficiently. Inherent elastic-plastic ductilities allow effective load sharing between individual filaments. High strength ductile metal wires therefore deliver improved fracture resistance thus providing better safety at reduced cost.

Most high strength wires are made of carbon steel with minor alloying elements. They are processed to provide strength around 3500 MPa. U.S. patents such as U.S. Pat. Nos. 5,779,829, 7,082,978, 6,247,514 and others claim strength of steel wires in the 4000 to 5000 MPa range. Commercial automobile tires have been built with 4000 MPa and higher strength steel wires. Currently 3500 MPa strength steels wires in the diameter range 0.15 mm to 0.38 mm are used in most pneumatic radial tires for use on passenger, light truck, medium truck and other applications. Construction geometry of the cable and proper coverage by a polymer/elastomer provide adequate protection against environmental degradation such as corrosion.

Successful experience of over a century of the use of steel wires in wire ropes, pressure hoses, tires, conveyor belts has provided a good confidence to explore its use in reinforcing pressure vessels. These vessels can be used for the storage of fluid such as hydrogen, compressed natural gas (CNG), oxygen, LPG and others for automobile, aerospace and other critical applications. The scope of the proposed invention is to design safer, light weight and economical pressure vessels by using metal wires.

The present invention describes methods of using high strength metal wires to reinforce a pressure vessel to optimize weight, toughness and cost. It additionally proposes methods for the assembly of the vessel and protection against environment.

National and International guidelines such as ISO 11439 has broadly categorized pressure vessels in four types. Type I is all metal while Type II, III and IV use fibers to reinforce-wrap a polymer or metal core tank. The present invention addresses Type II, III and IV and similar designs for other applications.

SUMMARY OF THE INVENTION

A pressure vessel for the storage of fluid being a type II or type III CNG, LPG or Hydrogen cylinder meeting ISO 11439 performance guidelines. The cylinder has a low-alloy high strength steel core having 800-1200 MPa strength, with a prior to being wrapped growth in size at burst up to 10 percent. The steel core has a cylindrical main body with hemispherical or other shaped ends; a wrapping of steel wire in a hoop or circumferential wrap around and covering at least the cylindrical main body. The steel wire is one or more monofilaments of a strength from 2000 MPa to 6000 MPa and where the wire has a plastic ductility of over 20% in reduction in area (RA) at tensile fracture. The finished cylinder forms a light reduced weight high toughness structure having a required leak before fail mode to prevent catastrophic failure and meets ISO 11439 performance guidelines.

The core liner of the vessel can be first wrapped with a resin covered ceramic fibers such as carbon, fiberglass and subsequently wrapped with the metal wire with or without other fibers. The metal wires can be of different diameters in parallel or cabled forms.

The wire is preferably made of steel and its alloys, in diameter range 0.05 mm to 2.5 mm, strength 2000 to 4200 MPa, RA ductility of over 20% and are of round, flat, oval or flat with rounded corner shapes. These wires can be plated with copper, zinc, tin, brass or nickel.

For circumferential reinforcement, the metal wire runs substantially circumferentially on the cylindrical portion of the vessel only. The wrap may comprise of one or more substantially flat tapes, each tape has multiple metal wire filaments with or without other fibers, all running substantially parallel to each other. The winding density of reinforcing wires is preferably higher on inner layers compared to outer layers with respect to the core of the vessel. The inner wraps on the cylindrical section of the vessel extends farther along the longitudinal axis of the vessel compared to subsequent outer wraps. The metal wires are covered with a polymer having more than 5% elongation at break and can have embedded metal powders such as zinc or aluminum which provide cathodic corrosion protection.

In one method, multiple metal wires and cables can be calendered in a rubber or polymer, proper width cut and wrapped over the core of the pressure vessel with wires running substantially transverse to the longitudinal axis of the vessel and where the end section of the calenderd fabric overlaps more than 5 cms from the start section. Additionally the calendered fabric can be used for longitudinal reinforcement by wrapping over the core of the pressure vessel with wires running approximately parallel to the longitudinal axis of the vessel.

A pressure vessel may have two or more rings of metal or polymer which are placed on the core to facilitate winding of fibers. Polymer or metal ferrules can be used to retain the starting and finishing portions of the wrap fiber.

The core tank can be made of a polymer or metal and plated with copper or nickel from inside to retard hydrogen diffusion. It can be made of a steel alloy having 0.2 to 1.5% chromium and is coated or plated with copper or nickel from inside. The core tank can have multiple segments all assembled by a brazing process where the brazing is conducted at a temperature substantially below the melting temperature of the core metal by using a brazing alloy and where joints are of overlap type.

The pressure vessel which has a core made of steel or steel alloys may have a cathodic protection by the use of an aluminum alloy sheet or wire or wire net in electrical or direct conductive contact with the outer surface of the metal tank and subsequently wrapped with high strength fibers

DETAILED DESCRIPTION OF THE INVENTION

Figure 1:
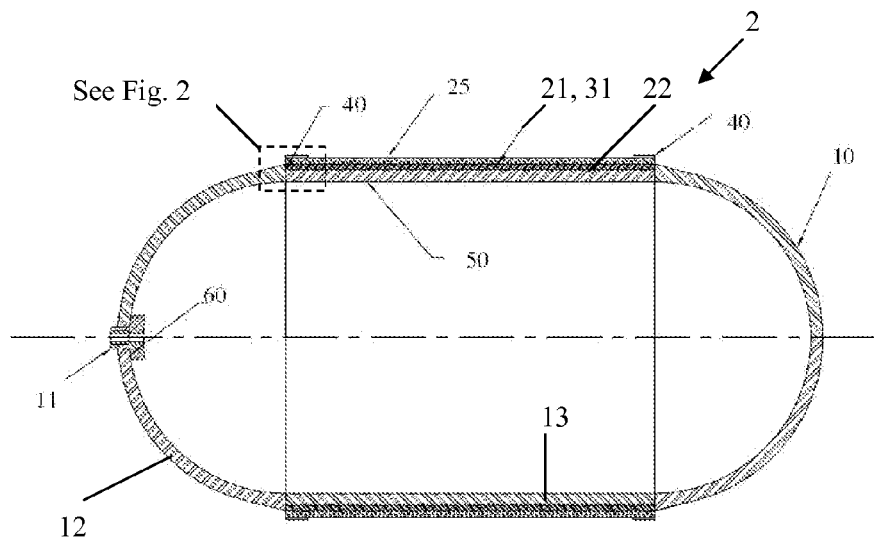
FIG. 1 is a composite wrapped pressure vessel which comprises of a core and wrap of high strength fibers which include metal wires. Two rings support the fiber winding. A polymer coating is applied to the metal fibers. The tank has a coating from inside.

Description of pressure vessels extends to several designs such as spherical vessels, vessels with a cylindrical section in the middle with dome or other shaped ends as shown in FIG. 1, pressure cylinders such as gun barrel, hydraulic cylinders and other similar structures. The present invention discloses a pressure vessel (2) having a core (10) made of metal or polymer with an opening and wrapped with reinforcing high strength fibers (21, 22). The fibers comprise of metal wires (21) with or without other fibers (22) such as fiberglass or carbon fibers. The metal wires (21) have strength in the range 2000 to 6000 MPa, preferably in the 2000 to 4000 MPa range. For improved impact resistance and toughness the metal wires (21) will have a ductility of more than 20 percent reduction in area (RA) at tensile fracture. The metal wires (21) will be in the diameter range of 0.10 mm to 2 mm and may be round, flat or flat with rounded corner. Wires (21) of different diameters and cables can be applied together to attain desired packing density. Steel wires (21) having above mechanical properties are preferred for the proposed application. The wires (21) may have a plating of copper or nickel or zinc or brass. It is preferred that the wires are additionally covered with a polymer (31) having a tensile elongation of more than 5% and preferably having metal powders such as zinc or aluminum to provide cathodic corrosion protection. A top wrap (25) of a polymer or shrink wrap may be applied for added protection to reinforcing fibers.

Wires (21) may be calendered first in a polymer or elastomer to form a roll of wrap fabric where multiple wires with required spacing run along the length of the fabric. Pieces of this wrap fabric (24) may be cut of proper length and wrapped over the core (10) of the vessel (2), preferably over the cylindrical section with wires (21) running in the circumferential direction. The start and finish ends of the wrapped fabric will have an over lap of more than 5 cm.

Figure 2:
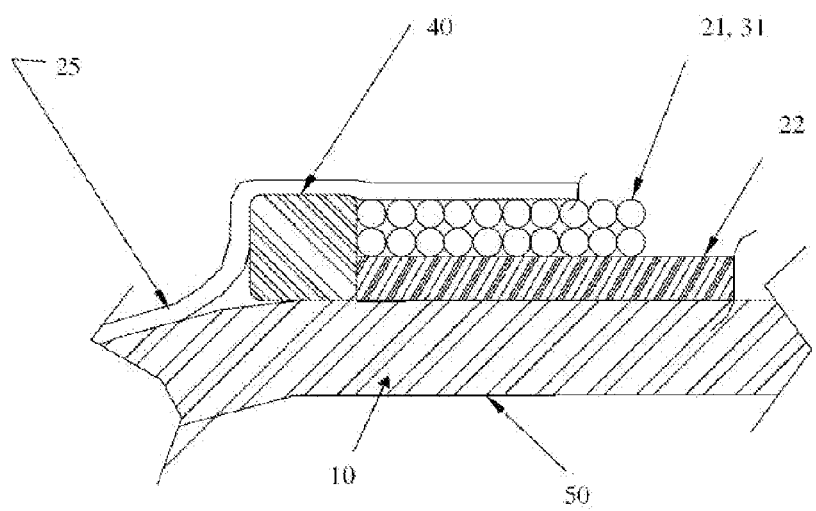
FIG. 2 is a cross section of a pressure vessel where a core with an inside coating is first wrapped with carbon fiber-epoxy composite followed by a wire wrap. Two support rings and a polymer top coat is also shown.
Figure 3:
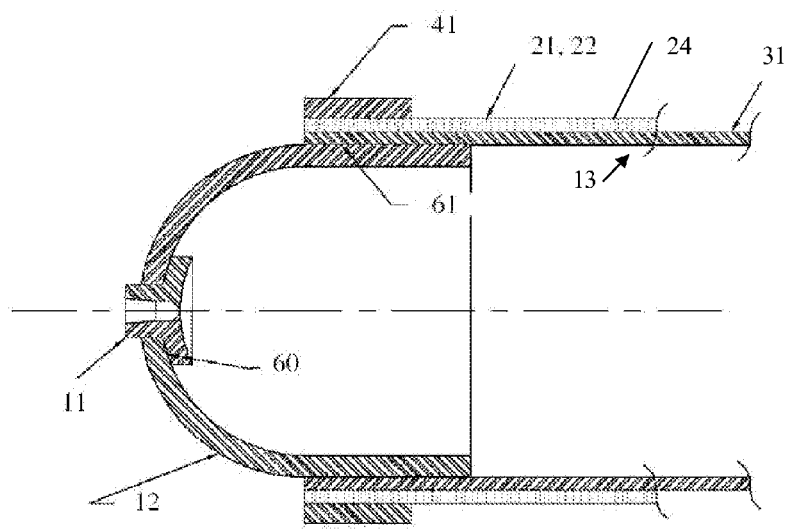
FIG. 3 is a steel core pressure vessel assembled by brazing various components. There is a plating of copper at the inside and the cylinder is circumferentially wrapped with high strength ductile wire.

The reinforcing fiber wrap (24) may cover the full tank (2) or only a part. For example a Type II tank as shown in FIGS. 1, 2 and 3 has only hoop wrap covering the cylindrical section only. For weight savings, a carbon fiber wrap (22) may first be applied on the core (10) followed by the metal wire wrap (21) on the top to protect the damage sensitive carbon wrap. The fiber packing density or the width along the longitudinal axis of the vessel may be higher on wraps closer to the core (10) compared to outer layers. One or two circumferential rings (40, 41) may be placed on either ends of the vessel (2) to facilitate winding of fibers (21, 22). The fibers may be attached to these rings (40, 41) for efficient start and finish of the winding. First and last one or two wraps of the wire (21) may be held either by the use of a ferrule or by a simple knot.

Low alloy high strength steel, aluminum and titanium alloys are commonly used to make the core (10) or tank of the pressure vessel (2). To retard damage due to environment or hydrogen-embrittlement, a plating of copper or nickel or brass may be applied at the inside (50) and outside surfaces of the tank. A brazing process may be used for the assembly of the core tank (10) where components such as the fill port (11), dome ends (12) and cylinder (13) have over lap sections (60, 61) which are diffusion bonded during or separately of the heat treatment cycle of the core.

Generally pressure vessels are categorized in four types as stated in the international standard for CNG cylinders, ISO 11439. Type I is made of all metal. Type II, FIGS. 1, 2 and 3, is lighter than Type I. It has a metal core (10) of substantial strength to withstand longitudinal stress and is circumferentially wrapped only on the cylindrical section (13), by high strength fibers (21, 22) embedded in resin (31) to provide balance of transverse strength. Type III and Type IV are lighter than Type II, have a metal or plastic liner/core and are fully wrapped by high strength fibers. The proposed invention covers Type II, III and IV cylinders for storage of any gases and fluids.

The present invention refers to pressure vessels (2) reinforced at the core (10) partially or completely with fibers (21, 22). Common fiber materials are carbon and fiber glass embedded in high quality resin. The modulus of carbon fiber is about three times to that of glass fibers. Higher modulus is strongly preferred for the reinforcement of a pressure vessel as it limits the growth at high stress thus minimizing other stresses such as discontinuity stress at joints. Another property of high importance is the fracture toughness of the material. In case of a failure, high toughness structure will lead to a required 'leak-before-fail' mode thereby preventing catastrophic failure. Glass and carbon fibers are of ceramic category and do not have any plastic ductility. This makes the structure more sensitive to defects as their fracture toughness is significantly low. Organic fibers such as polyester, aramid and nylon have good ductility, but have cost, modulus and or temperature resistance disadvantages. Proposed invention uses very high strength and ductile metal wires, such as tire cord quality steel wires in the wrap to deliver high fracture toughness, high modulus at a lower cost.

Metal wires such as steel wires have high modulus comparable to carbon fiber composites. Steel wire is commonly used in reinforcing high pressure hoses where they are used in braided mode. Several patents such as U.S. Pat. No. 2,829,671 discuss the braded structure of a high pressure hose. High modulus and good plastic ductility of metal wires provide higher toughness at lower weight. Metal wires can withstand higher temperature and are more environmentally stable than organic fibers. These properties are the reason for their use in tires, conveyor belts and hoses for over a century. Recent developments have taken the strength of commercial wire to above 4000 MPa strength. Plain high carbon steel wires which are relatively inexpensive, have strength over 3000 MPa at around 0.2 mm diameter. With micro alloying, this steel can be drawn to strength in excess of 4200 MPa. Commercial passenger and light truck tires have been made using 4000 MPa wire called 'ultra tensile wire'. Strength up to 6000 MPa is well within the current process capability; though require careful control of chemistry, microstructure and wire drawing processes. More details on the composition and processing of these wires can be found in U.S. patents which is incorporated herein by reference in its entirety. Metallurgical processing methods such as formation of 'dual phase' in low to medium carbon steel have claimed strength above 4000 MPa.

For the reinforcement of pressure vessel, this invention prefers wire of strength between 2000 to 5000 MPa with over 20% RA ductility. The RA (reduction in area) is area of the neck down cross section following a tensile break compared to the original cross sectional area of the wire. The 4000 MPa steel wire exceeds this ductility requirement. The wires are available in the 0.1 mm to 2 mm diameters. Wires of other metals such as Nickel and Titanium alloys can also be made to high strength in the range 2000 to 6000 MPa, though these wires are much expensive compared to carbon steel wire. Wires of other than round cross sections are routinely manufactured and may be suitable for this application. Flat and oval wires will provide better packing density and uniform contact pressure on the core cylinder.

These high strength wires (21) due to their high multi axial ductility can be easily processed to a cable or cord comprising of multiple filaments of same or different sizes. In most high strength cables the helix angle is set high to favor very high total longitudinal modulus and strength. Typical high strength cables and cords have 2 to 30 filaments and provide over 85% of the modulus and strength compared to the sum of individual wires' strength. It is also feasible to make a cord with no twist and place the bundle directly in a polymer or rubber. Patents have been filed and products made of hybrid cables where the cable has a combination of metal wires and other fibers such as aramid.

For the purpose of winding a pressure vessel, it is preferred to use a substantially flat tape/ribbon of parallel wire filaments of same or different sizes. The tape may have a blend of wire and other fibers such as glass or carbon. The flat ribbon has the advantage of better packing, especially when multiple layers are required. A method of calendaring multiple wires is discussed in U.S. Pat. Nos. 5,337,972 and 5,425,830 which are incorporated by reference herein in their entirety.

Pressure vessel equations suggest that in an internally pressurized vessel, stress on the inside of the vessel is greater than outside. The wrapping arrangement can thus be adjusted to address this stress environment. The wire density, also expressed as number of filaments per inch or centimeter width, can be higher on inner wraps compared to outer wraps. In applications requiring a separate circumferential wrap, the width of wire coverage along the longitudinal axis of the vessel may gradually decrease with increasing distance from the core.

Wire and cables (21) are usually protected by the application of an appropriate coating or by embedding in a polymer which has a corrosion inhibitor. Commercial polymer containing high percentage of zinc, aluminum or other metal is available to provide galvanic protection to the base wire (21) while preventing penetration of moisture. These paints are commonly used to protect steel on bridges and similar structures. It is important that the polymer coating has an elongation to break of more than 5% to meet the ductility of wire (21) and other structural components. Cathodic corrosion protection to steel core tank (10) and wire (21) can also be achieved by using a sacrificial metal such as aluminum alloy in sheet or wire or wire net form (70). It can be wrapped on the core tank (10) first before wrapping with the reinforcing steel wire (21). This method will protect both, the core (10) and the wrap wire (21, 22).

Steel and other most metals may additionally require protection against penetration of hydrogen which may reduce its ductility. Atomic hydrogen is known to penetrate into steel at elevated temperature and pressure. Literature indicates that face centered cubic nickel or copper significantly retard penetration of hydrogen to steel. It is therefore proposed that the steel core tank and steel wires may be plated with copper, nickel or brass or zinc to improve protection against hydrogen and simple corrosion. Multiple thin coatings of one or more of the above referenced metals may be applied. Additionally a polymer coating may also be applied to improve environmental resistance of the metal. A diffusion heat treatment will make the metal plating and core metal bond stronger. It is proposed that such metal plating be applied to polymer core tanks also to retard leakage of hydrogen from the tank. Retarding leakage may help improve the life of the wrap material such as steel besides conserving the stored fluid.

Certain pressure vessels, e.g. those used for the storage of CNG use a low-alloy high strength steel. Typical composition falls in category SAE 4130 to 4140 series having 0.6 to 1.5% chromium and 0.1 to 0.5% molybdenum. They are heat treated to 800 to 1200 MPa strength. It is proposed that a plating of copper of 0.05 to 0.1 mm (0.002 to 0.005") thickness on the inside of the steel core be applied to prevent penetration of high pressure hydrogen from inside. The plating process will be followed by a heat treatment cycle to strengthen the steel. This heat treatment will also help drive most hydrogen out of the steel which had migrated inside to the metal earlier during plating or other processes. A layer of a polymer coating over the copper plating may further resist the hydrogen and other corrosion reaction.

Depending upon the cost and weight requirements, wires (21) can be applied to reinforce a vessel (2) in a number of ways. Currently a very light weight vessel has a polymer or metal core (10) which is wound completely with epoxy treated carbon fibers (22). In certain cases an over wrap of fiberglass reinforced polymer is applied to protect the damage sensitive carbon fibers (22). It is proposed that in such cases, the full winding be done by a mixture of both steel and carbon fibers. Both fibers have comparable modulus and strength. Steel wires or cables (21) are approximately round in cross section. Carbon fibers (22) are of much smaller diameters than steel wires and can therefore fill the space between the wires (21) thus improving the packing density.

To take advantage of the carbon fiber-polymer composite which has high modulus and high strength at low density, the vessel may be wrapped first by carbon fibers (21). High strength metal wires (21) may be used for the upper layers to provide dent or impact protection to the damage sensitive carbon fibers while providing comparable strength and modulus. Currently certain designs use an upper layer of fiberglass-polymer composite to protect the carbon fiber (22). The high strength wire (21) due to its high modulus and high fracture toughness will be a far better material for the top layers. A fiberglass-polymer composite or only polymer layer (25) may still be used at the top to provide a barrier to environment penetration to the core structure.

In another application, where the pressure vessel (2) has a cylindrical main body (13) for the core (10) with hemispherical or other shaped ends (12), the full cylinder may first be wrapped with carbon, fiberglass or other fibers (22). Tangential stress on the cylindrical section is over two times compared to the longitudinal stress. This requires a circumferential wrap over the cylindrical portion by fibers. This can be done with either a full steel wire (21) or a blend of steel (21) and other fibers (22). Advantage of this concept is to reduce weight and cost while maintaining toughness and damage tolerance along the maximum diameter surfaces.

By using carbon fibers (22) and high strength metal wires (21) together, there is a remote possibility of a significant stress concentration at the contact points of wire (21) to carbon fiber (22). This may affect the strength of the carbon fiber (22) which has low fracture toughness. This can be resolved by separating the wire (21) and carbon fibers (22) by several methods. A layer of polymer or a fabric (31) may be used to separate the carbon fiber and metal wire layers or wraps. Alternately, especially for hoop winding only, the wrap (24) can be done alternately. In this case a wrap of a fixed width, for example 1 cm will be done by carbon fiber. This ring of carbon fiber (22) composite will be followed by an equal or different width of metal wires (21). This will keep the two materials separate. A finite element analytical analysis will help design the width and thickness of each fiber. A top wrap (25) of polymer, rubber or common shrink wrap may be applied for final finish and protection to fibers against damage and moisture penetration.

In a Type II cylinder, the longitudinal stresses are balanced by the liner metal itself. A fiber wrap is required on the cylindrical section to meet the tangential stresses. In this application a wire (21) wrap (24) can be applied in place of other fibers (22). To improve the packing density, wires of different diameters can be used. Or alternatively a hybrid mix of wire (21) and carbon or fiberglass or other fibers (22) can be used.

Single or multiple ends of the wire or cable (21) can be wrapped directly on the cylinder core (10) with appropriate angle to provide the required reinforcement. Higher diameter wires are stiffer. The starting or finish end may not conform properly to the curvature of the pressure vessel to start a smooth winding. It is suggested that in such cases multiple ferrules (42) of thin wall made of polymer or metal be used to hold the free end with adjacent wraps. Ferrules can be crimped for stability. During burst test of the cylinder core (10), the structure may grow from 1 to 10%. Placement of ferrule (42) has to be done in such manner so as to allow the stretch in wire (21) and not to allow unraveling during extreme loadings. There are other methods to address the start and finish end problems. The ends can be tucked and wrapped underneath the adjacent wraps (24) to develop enough friction to prevent slide. Or the ends can simply be held by a strong adhesive tape such as aluminum tape.

In certain applications, it may be better to use retaining rings (40) on the either side of the cylindrical section of the vessel. The rings (40) can be of metal or polymer. It can be attached by friction fit or with appropriate adhesive. The start and finish ends of the fiber can be fastened or clipped to these rings. The ring can have a locking slot such as those found in plastic tie strips used for holding group of electrical wires together, where the slot has a one way pull locking arrangement. The retaining rings (41) may be applied on the top of the wire wraps to prevent unraveling.

For certain applications such as tire, wire cables are used in rubber calendered form which is vulcanized. This process produces an unvulcanized fabric typically 1 to 2 meters wide where wires run parallel along the length and are embedded in rubber. The calendered fabric can be wrapped multiple times on the cylindrical portion of the vessel to provide the required circumferential strength. Advantage of this process is that the starting and finish part of the calendered fabric can have an overlap where the finish end will extend beyond the underneath starting end on the circumference of the core. An over lap of more than 5 centimeters is recommended. Once wrapped onto the core (10), the assembly can be vulcanized curing the polymer or rubber. Once the polymer/rubber/elastomer is cured, there is sufficient adhesive bond strength that the wire will not unravel during the burst test of the vessel (2). In calendered treatment the wire (21) is usually plated with copper and brass and a special formulation of rubber is used to develop a strong chemical bond between the rubber and the wire. There are other chemicals available which can be applied to metal to develop a strong bond with the polymer.

Figure 4:
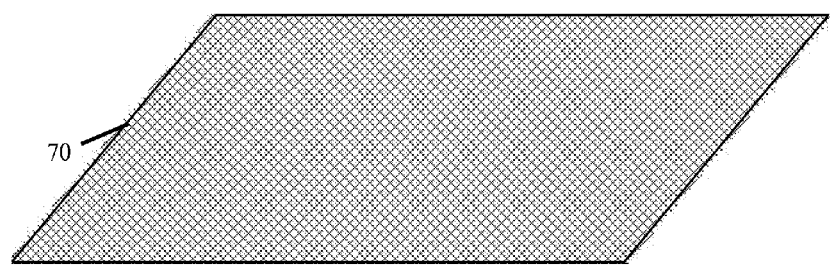
FIG. 4 is a metal wire net which can be used as a reinforcing wrap and/or if made of certain metals, can be used for cathodic protection.
Figure 5:
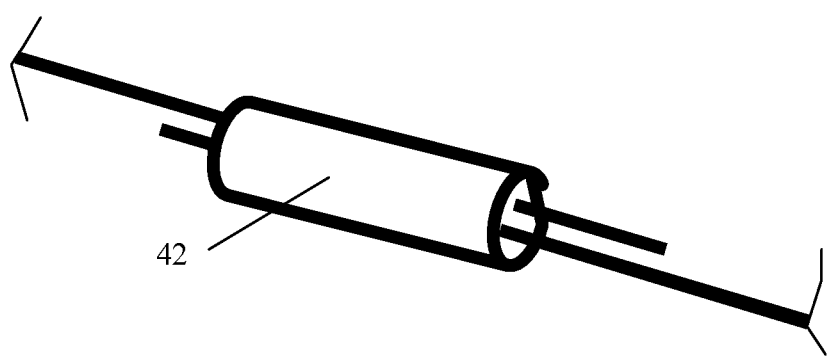
FIG. 5 is a metal ferrule attaching the starting end of the wire to the adjacent hoop of wire.

The fine metal wires (21) can be weaved to develop a wire net (70). Wire count, diameters and or weaving pattern can be set to make a net (70) where strength in the longitudinal direction is higher, preferable double to that of transverse direction. The net (70) with openings is a good reinforcement material to polymer or other fiber reinforced composites. In experiments conducted by this inventor, 3500 MPa, 0.35 mm steel wires were woven to 15 mesh (wires per inch). Five volume percent of this net (70) along with E or S Glass cloth in epoxy resin was processed to make industry standard G-10 type composite. The fracture toughness of the composite plate increased from 30 to 100%. This composite net structure can be used to make a pressure vessel (2) of improved toughness and safety as shown in FIG. 4.

The core tank in the current Type II is made of low alloy high strength steel such as AISI/SAE 4137 steel. The core has a wall thickness as shown in FIG. 1 and is made of a seamless tube and the ends are closed by the spin form process. Reduced wall thickness of Type II compared to Type I can provide an advantage in manufacturing. It can be assembled by brazing the main cylindrical sections (13) with dome ends (12) and nozzle area (11) as shown in FIG. 3. A brazing process is conducted at temperatures below the melting temperature of the base metals. This process can be combined with the heat treatment strengthening cycle of the base metal to economize cost. As discussed earlier in this section, inside plating, hydrogen diffusion, brazing and heat treatment of steel can all be combined in one heat treatment process.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

I claim:

1. A pressure vessel for the storage of fluid being a type II or type III CNG, LPG or Hydrogen cylinder meeting ISO 11439 performance guidelines, the cylinder comprising:
a low-alloy high strength steel core having 800-1200 MPa strength, with a prior to being wrapped growth in size at burst up to 10 percent, the steel core having a cylindrical main body with hemispherical or other shaped ends, the core being of a wall thickness made of a seamless tube wherein the ends are closed by a spin form process;
a wrapping of steel wire in a hoop or circumferential multi-layered wrap around and covering at least the cylindrical main body, the steel wire being helically wound in one or more strands, each strand being a monofilament wire of 0.35 mm diameter of a strength in the range of greater than 3000 MPa to 6000 MPa and where the wire has a plastic ductility of over 20% in reduction in area (RA) at tensile fracture;
a top wrap for protection against damage and moisture penetration; and
wherein the finished cylinder forms a light reduced weight high toughness structure having a required leak before fail mode to prevent catastrophic failure and meets ISO 11439 performance guidelines, wherein the wires are covered with a polymer having more than 5% elongation at break to meet the ductility of wire of over 20 percent in reduction in area RA at tensile fracture.

2. A pressure vessel for the storage of fluid being a type II or type III CNG, LPG or Hydrogen cylinder meeting ISO 11439 performance guidelines, the cylinder comprising: a low-alloy high strength steel core having 800-1200 MPa strength, with a prior to being wrapped growth in size at burst up to 10 percent, the steel core having a cylindrical main body with hemispherical or other shaped ends, the core being of a wall thickness made of a seamless tube wherein the ends are closed by a spin form process; a wrapping of steel wire in a hoop or circumferential multi-layered wrap around and covering at least the cylindrical main body, the steel wire being helically wound in one or more strands, each strand being a monofilament wire of 0.35 mm diameter of a strength in the range of greater than 3000 MPa to 6000 MPa and where the wire has a plastic ductility of over 20% in reduction in area (RA) at tensile fracture; a top wrap for protection against damage and moisture penetration; and wherein the finished cylinder forms a light reduced weight high toughness structure having a required leak before fail mode to prevent catastrophic failure and meets ISO 11439 performance guidelines; wherein multiple wires and cables are calendered in a rubber or polymer, proper width cut and wrapped over the core of the pressure vessel with wires running substantially transverse to the longitudinal axis of the vessel and wherein the start and end lines of the calendered treatment has an overlap of over 5 cm.

3. A pressure vessel for the storage of fluid being a type II or type III CNG, LPG or Hydrogen cylinder meeting ISO 11439 performance guidelines, the cylinder comprising:
a low-alloy high strength steel core having 800-1200 MPa strength, with a prior to being wrapped growth in size at burst up to 10 percent, the steel core having a cylindrical main body with hemispherical or other shaped ends, the core being of a wall thickness made of a seamless tube wherein the ends are closed by a spin form process;
a wrapping of steel wire in a hoop or circumferential multi-layered wrap around and covering at least the cylindrical main body, the steel wire being helically wound in one or more strands, each strand being a steel monofilament wire having a diameter of 0.35 mm and a strength of 3500 MPa and where the wire has a plastic ductility of over 20% in reduction in area (RA) at tensile fracture;
a top wrap for protection against damage and moisture penetration; and
wherein the finished cylinder forms a light reduced weight high toughness structure having a required leak before fail mode to prevent catastrophic failure and meets ISO 11439 performance guidelines.

* * * * *